US008386689B2

(12) United States Patent
Thomas, III et al.

(10) Patent No.: US 8,386,689 B2
(45) Date of Patent: Feb. 26, 2013

(54) INTERFACE ADAPTER SYSTEMS AND METHODS

(75) Inventors: Fred Charles Thomas, III, Fort Collins, CO (US); Bryce Carl Wemple, Fort Collins, CO (US); Charles Shilling, Fort Collins, CO (US); Allen O. Buckner, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 12/856,523

(22) Filed: Aug. 13, 2010

(65) Prior Publication Data

US 2012/0042112 A1 Feb. 16, 2012

(51) Int. Cl.
*G06F 13/00* (2006.01)
(52) U.S. Cl. ............................ 710/315; 710/301; 710/72
(58) Field of Classification Search .................. 710/301, 710/302, 315, 72, 313; 711/115; 361/679.02, 361/679.32, 679.33, 679.4, 728, 730, 731, 361/736, 760, 785, 796, 803
See application file for complete search history.

(56) References Cited

U.S. PATENT DOCUMENTS

| 6,115,771 | A | * | 9/2000 | Born | 710/315 |
|---|---|---|---|---|---|
| 6,813,668 | B2 | * | 11/2004 | Tseng et al. | 710/301 |
| 7,051,149 | B2 | * | 5/2006 | Wang et al. | 710/315 |
| 7,466,557 | B2 | | 12/2008 | Watanabe | |
| 7,506,092 | B2 | * | 3/2009 | Su | 710/301 |
| 7,886,104 | B2 | * | 2/2011 | Lai et al. | 710/301 |
| 2004/0083325 | A1 | * | 4/2004 | Rabinovitz et al. | 710/315 |
| 2005/0165998 | A1 | * | 7/2005 | Bolt et al. | 710/315 |
| 2006/0065721 | A1 | | 3/2006 | Addison et al. | |
| 2007/0162676 | A1 | * | 7/2007 | Hsu et al. | 710/301 |
| 2008/0036780 | A1 | * | 2/2008 | Liang et al. | 345/522 |
| 2009/0100207 | A1 | * | 4/2009 | Jones et al. | 710/301 |
| 2009/0164685 | A1 | | 6/2009 | Chen et al. | |

OTHER PUBLICATIONS

Patrick Schmid, A Hard Disk in a PCI Slot? The Upgradeware HD25-I/IS, Jun. 17, 2005, http://www.tomshardware.com/reviews/a-hard-disk-a-pci-slot,1061.html.

* cited by examiner

*Primary Examiner* — Glenn A Auve
(74) *Attorney, Agent, or Firm* — Michael Czarnecki

(57) ABSTRACT

Interface adapter systems and methods are provided. An adapter means can be provided for coupling a first interface to a second interface, the second interface configured to accommodate the coupling of a peripheral device. A detector means can be provided for detecting the peripheral device. A means can be provided for communicating a first signal to a first bus when the peripheral device is not detected. A converting means can be provided to convert a first signal to a second signal having a protocol different than the first and a communications means for communicating the second signal to a second bus can be provided when the detecting means has detected the peripheral device.

19 Claims, 4 Drawing Sheets

INTERFACE ADAPTER SYSTEMS AND METHODS

BACKGROUND OF THE INVENTION

Description of the Related Art

With the growing popularity of digital media, servers are becoming a more and more common feature in homes and small to medium sized businesses. Since servers are often consigned to back rooms and other out of the way locations, and to keep manufacturing costs to a bare minimum, manufacturers of such devices frequently minimize the number of input and output (collectively: I/O) connections or ports provided on such devices. Thus, any attempt to use a peripheral device designed for use in full-fledged, full capability, personal computer system on a server is often met with frustration given the lack of appropriate I/O connections to couple the peripheral device to the server.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
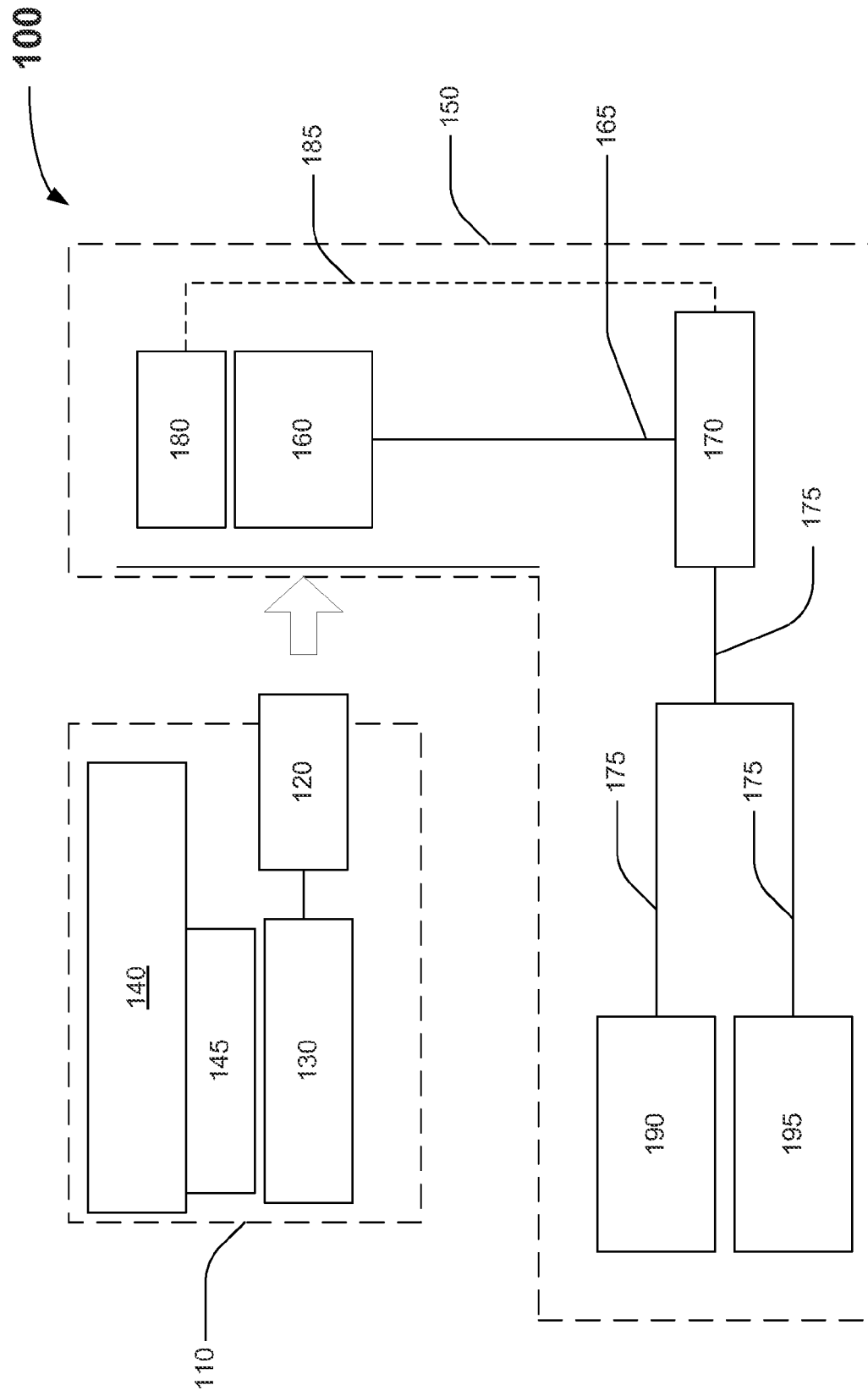
FIG. 1 is a block diagram depicting an illustrative adapter system, according to one or more embodiments described herein.

The home and SMB (small to medium business) server markets are highly cost competitive segments since both consumers and small businesses are usually quite cost conscious. As such, server manufacturers targeting this market segment frequently use standardization across a product line to minimize manufacturing costs to provide consumers with the greatest number of features at the lowest possible cost. Home and SMB servers frequently have a number of HDD (hard disk drive) bays installed within an HDD rack structure. The drive bays are often equipped with a single type of interface, for example a SATA (Serial Advanced Technology Attachment) interface, for coupling one or more HDDS to the server. Since home and SMB servers are frequently shipped with less than the full complement of HDDs, unused or open, HDD drive bays and SATA interfaces are often available within the HDD rack.

As part of the manufacturer's attempt to manage and minimize cost, server motherboards are manufactured with few or even no expansion slots. Home and SMB users who would like to add peripherals to a server are often frustrated by the lack of organic expansion capacity within the server. The ability to add peripherals other than those using a SATA interface is therefore a desirable feature within the home and SMB server market.

An adapter system is provided. The system can include an adapter having a first interface coupled to a second interface. The system can further include an electronic device having a receiver detachably attachable to the first interface and configured to accommodate the adapter. The electronic device can also include a processor coupled to the first interface, a detector, a first bus, and a second bus. The detector can be configured to provide an indicator upon detection of the peripheral device. The processor can be configured to convert at least a portion of a first signal communicated via the first interface to a second signal and pass the signal to the second bus when the indicator is present. The processor can be further configured to pass the first signal communicated via the first interface to the first bus when the indicator is absent.

As used herein, the terms "couple", "coupling" or any connection by which entities are referred to as "coupled", is one by which electromagnetic signals, physical communications, and/or logical communications may be transmitted and/or received. Typically, a communicative coupling includes a physical interface, an electrical interface, and/or a data interface, but it is to be noted that a communicative coupling may include differing combinations of these or other types of connections sufficient to allow intermittent or continuous communication or control. For example, two entities can be communicatively coupled by being able to communicate signals to each other directly or through one or more intermediate entities like a connector, processor, operating system, a logic device, software, or other entity. Logical and/or physical communication channels can be used to create a communicative coupling.

As used herein, the terms "communicate," "communication," and any process where two entities are referred to as "communicating" with either each other or another device can refer to one-way data transmission, one-way data reception, or two-way data transmission and reception. The term can variously refer to, for example, analog or digital data transmission, analog or digital data reception, or analog or digital data transmission and reception.

Another interface adapter system is provided. The system can include an adapter means for coupling a first interface to a second interface, where the second interface configured to accommodate the coupling of a peripheral device. The system can further include a detector means for detecting the peripheral device. The system can also include a means for communicating a first signal from the first interface to a first bus when said peripheral device is not detected, and a means for converting the first signal to a second signal and a means for communicating the second signal to a second bus when said peripheral device is detected.

An interface adapter method is provided. The method can include coupling a peripheral device to a second interface disposed on an adapter, the adapter including a first interface coupled to the second interface. The method can include detachably attaching the adapter to an electronic device, the electronic device including a processor coupled to a detector, first bus and second bus. The method can include detecting the device prior to coupling the processor to the first interface followed by coupling the processor to the first interface. The method can include receiving at the processor, a first signal from the first interface and communicating at least a portion of the first signal to the first bus when the device is not detected. The method can also include converting at least a portion of the first signal to a second signal and communicating at least a portion of the second signal to a second bus when the peripheral device is detected.

An interface adapter apparatus is also provided. The apparatus can include and adapter configured to mount within a 3.5 inch hard disk drive carrier. The adapter can include a first interface using a SATA (Serial Advanced Technology Attachment) protocol couplable to an external electronic device. The adapter can further include a second interface using a PCIe (Peripheral Component Interconnect Express) protocol, coupled to the first interface.

The adapter apparatuses, systems, and methods described herein can, for example, permit the coupling of one or more natively unsupported peripheral devices to an electronic device using one or more unused interfaces (e.g., the first interface) disposed in, on, or about the electronic device.

FIG. 1 is a block diagram depicting an illustrative interface adapter system 100, according to one or more embodiments. The system 100 can include an adapter 110 detachably attachable to an electronic device 150. In at least some embodiments, a first interface 120 disposed on the adapter and a complimentary first interface 160 disposed on the electronic device can be detachably attached to functionally couple the adapter 110 to the electronic device 150. The adapter 110 can also include a second interface 130 coupled to the first interface 120. The second interface 130 can be the same as or different from the first interface 120. In some embodiments, a peripheral device 140 can be coupled to the adapter 110, for example via a complimentary second interface 145 disposed in, on, or about the peripheral device 140.

The electronic device 150 can include a complimentary first interface 160, which in some embodiments can be coupled to a processor 170. The processor 170 can also be coupled to a detector 180, a first bus 190, and a second bus 195. Such an arrangement can facilitate the communication of data, for example, from the first interface 120 through the processor 170 to either or both the first bus 190 or the second bus 195.

The adapter 110 can include any device, member, structure, or component suitable for providing a support or substrate for the first and second interfaces 120, 130. The adapter 110 can have any physical size, shape, or configuration suitable for coupling to the electronic device 150 via the first interface 120. In some embodiments, the adapter can be disposed completely within the electronic device 150, for example within a receiver or similar structure disposed within the electronic device 150. In other embodiments, the adapter can be disposed partially or completely external to the electronic device 150. In some embodiments, the adapter 110 can be configured or otherwise adapted to mount within a 3.5 inch HDD (hard disk drive) carrier, for example a 3.5 inch HDD carrier suitable for hard drive cage mounting within Hewlett-Packard Media Smart home and SMB (small to medium business) servers.

At least a first interface 120 and a second interface 130 can be mounted or otherwise disposed in, on, or about the adapter 110. The first interface 120 can be coupled to the second interface 130 either directly, for example by direct pin-to-pin association, or indirectly, for example through one or more intervening circuits adapted to convert or otherwise modify the signal provided from the second interface 130. The first interface 120 can include a wired or wireless interface. The first interface 120 can include any interface suitable for providing communication between the adapter 110 and a coupled electronic device 150. The first interface 120 can include, but is not limited to, one or more industry standard interfaces, for example, an Advanced Technology Attachment ("ATA") interface; a Serial ATA ("SATA") interface; a Small Computer System Interface ("SCSI"); a Serial Attached SCSI ("SAS") interface; a fibre channel interface; an IEEE 1394 interface; and a Universal Serial Bus ("USB") interface. The first interface 120 can, in some embodiments, be detachably attached to a complimentary first interface 160 disposed in, on, or about the electronic device 150.

The second interface 130 can include any interface suitable for providing communication between a peripheral device 140 and the first interface 120. The second interface 130 can include any form or type of interface, for example a wired interface or a wireless interface. The second interface 130 can include, but is not limited to, one or more industry standard interfaces, for example, a Peripheral Component Interconnect ("PCI") interface; a Peripheral Component Interconnect Express ("PCIe") interface; or a Universal Serial Bus ("USB") Version 1.0, 1.1, 2.0, or 3.0 interface. In some embodiments, the peripheral device 140 can incorporate a complimentary second interface 145 that is detachably or non-detachably attachable to the second interface 130. For example, the second interface 130 can include a PCIe compliant slot and the peripheral device 140 can include a PCIe include a complimentary second interface 145 including a row of peripheral contacts that can be coupled to the PCIe compliant slot second interface 140.

The electronic device 150 can include a complimentary first interface 160 coupled to a processor 170. The processor 170, in turn, can be coupled to a detector 180, a first bus 190, and a second bus 195. All or a portion of the complimentary first interface 160, processor 170, detector 180, first bus 190, and second bus 195 can be disposed partially or completely within an enclosure, for example a tower enclosure disposed about a home or SMB server. In some embodiments, the complimentary first interface 160 can be disposed proximate a hard disk drive cage structure within the electronic device 150, such a structure can permit the detachable attachment of one or more HDDs to the electronic device 150. In some embodiments, the detector 180 can be disposed within the electronic device 150, positioned to detect the installation of a peripheral device 140 within the adapter 110. In some embodiments, the complimentary first interface 160 and the detector 180 can be coupled to a remote processor 170, for example a processor 170 disposed on a backplane or motherboard within a home or SMB server. In some embodiments, the processor 170 can be coupled to a plurality of busses, for example a first bus 190 and a second bus 195. All or a portion of the plurality of busses can be coupled to a central processing unit (CPU) either directly or indirectly, for example through one or more Southbridge and Northbridge controllers.

The complimentary first interface 160 can include any type of wired or wireless interface suitable for coupling one or more peripheral devices 140 to the electronic device 150. In some embodiments, the complimentary first interface 160 can include, but is not limited to, one or more industry standard interfaces, for example an Advanced Technology Attachment ("ATA") interface; a Serial ATA ("SATA") interface; a Small Computer System Interface ("SCSI"); a Serial Attached SCSI ("SAS") interface; a fibre channel interface; an IEEE 1394 interface; and a Universal Serial Bus ("USB") interface. In some embodiments, the complimentary first interface 160 can be disposed proximate a hard drive cage structure disposed at least partially within an electronic device 150, for example the complimentary first interface 160 can be a SATA interface disposed proximate a hard drive cage disposed within a home or SMB server, positioned to facilitate the slidable insertion of a HDD carrier or adapter 110 having a first interface 120.

The complimentary first interface 160 can be coupled to the processor 170 using at least one conductor 165. In some embodiments, the at least one conductor 165 can include at least one multi-conductor cable or bus, for example an ATA bus disposed on a backplane of the electronic device 150.

The processor 170 can include any number of systems, devices, or any combination of systems and devices suitable for transmitting, communicating, converting, multiplexing or otherwise manipulating a signal received via the at least one conductor 165. In some embodiments, the processor can include any number of systems, devices, or any combination of systems and devices suitable for communicating between the complimentary first interface 165, the first bus 190 and the second bus 195. In some embodiments, the processor 170 can multiplex and communicate a plurality of signals on the first bus 190 and the second bus 195.

The processor 170 can be coupled to a plurality of busses via one or more conductors 175, for example the processor can be coupled to the first bus 190 and the second bus 195 via one or more conductors 175. The first bus 190 and the second bus 195 can comply with one or more industry standard bus protocols, for example in some embodiments the first bus 190 can comply with an ATA (Advanced Technology Attachment) protocol while the second bus 195 can comply with an PCI (Peripheral Component Interconnect) protocol. In some embodiments, the first bus 190 can include a bus compliant with, although not limited to, one or more of the following protocols: an Advanced Technology Attachment ("ATA") bus; a Small Computer System Interface ("SCSI"); a Serial Attached SCSI ("SAS") bus; a fibre channel bus; an IEEE 1394 bus; and a Universal Serial Bus ("USB") bus. In some embodiments, the second bus 195 can include a bus compliant with, although not limited to, one or more of the following protocols: a Peripheral Component Interconnect ("PCI") bus and a Universal Serial Bus ("USB") bus.

The detector 180 can be coupled to the processor 170 via one or more conductors 185. The detector 180 can include any number of systems, devices, or any combination of systems and devices suitable for detecting the presence of a peripheral device 140 within an adapter 110 coupled to the electronic device 150, for example via the complimentary first interface 160. The detector 180 can incorporate one or more detection technologies, including but not limited to a mechanical detector, an optical detector, a magnetic detector, an electro-magnetic detector, a proximity detector, and an electrical detector.

In at least some embodiments, the detector 180 can detect the presence of the peripheral device 140 prior to the coupling of the first interface 120 on adapter 110 with the complimentary first interface 160 on the electronic device 150. Determining whether peripheral device 140 is present prior to coupling the first interface 120 can permit the processor 170 to properly assign contacts within the complimentary first interface 160 before coupling the adapter 110. Such a determination can minimize the likelihood of damage to either the processor 170 or the adapter 110 due to an incompatible pin assignment, for example by communicating a relatively high voltage device power supply over a relatively low voltage device signal circuit.

In another illustrative example, where the first interface 120 is a SATA interface and the second interface 130 is a PCI interface, the conductors forming the PCI interface 130 can be cross-mapped to the conductors forming the SATA interface 120. If the adapter 110 is inserted without a peripheral device 140, the cross-mapping between the PCI and SATA interfaces 120, 130 causes no compatibility problems. If, however, the adapter 110 is inserted with a PCI-compliant peripheral device 140 coupled to the second interface 130, damage could potentially occur to either or both the peripheral device 140 and the processor 170 if the processor 170 is expecting the attachment of a SATA compliant device (i.e. a device using a conventional SATA protocol) to the complimentary first interface 160. Detection of the peripheral device 140 prior to the coupling of the adapter 110 to the electronic device can assist in minimizing the likelihood of such damage.

Figure 2:
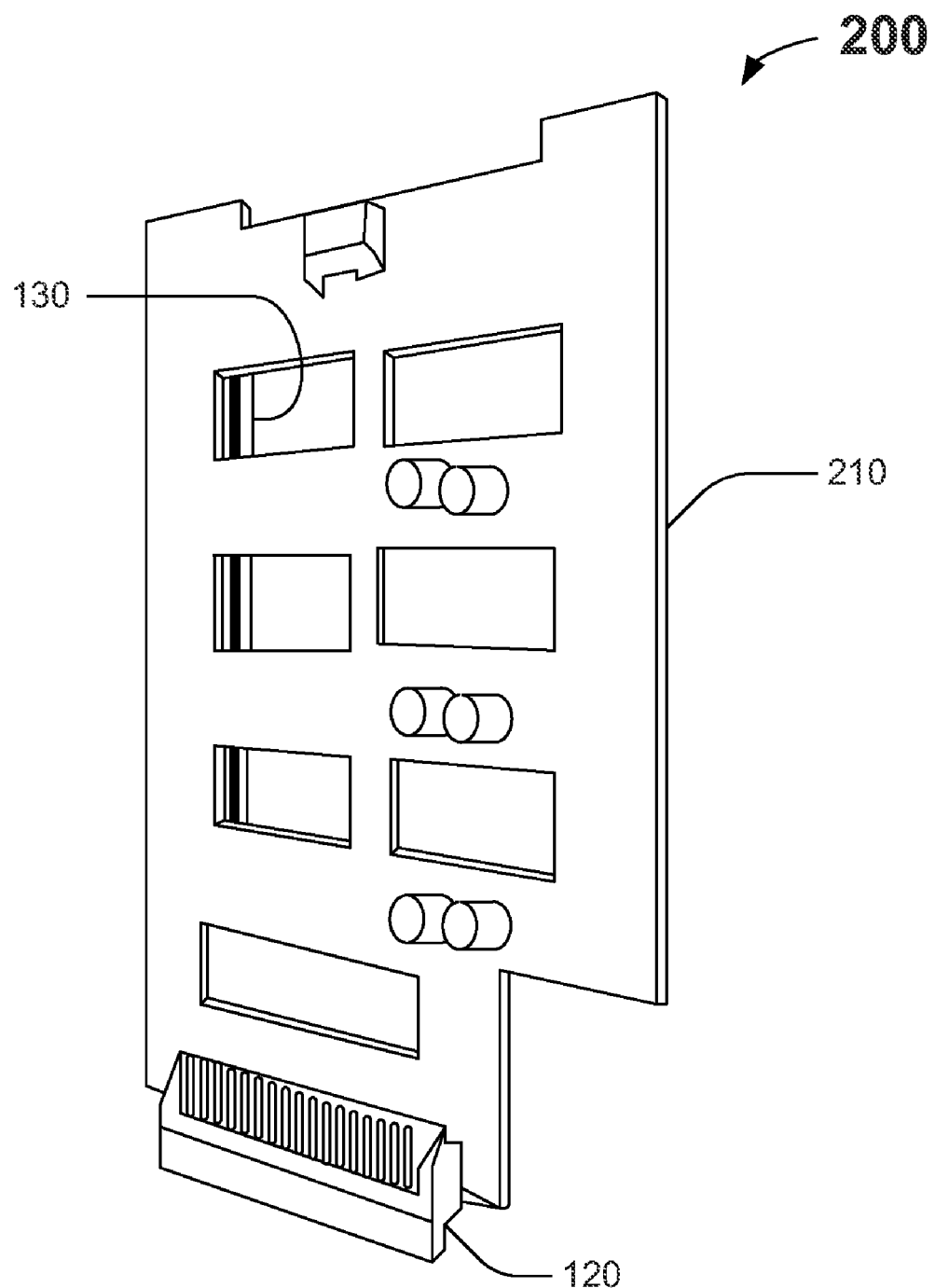
FIG. 2 is a perspective view depicting an illustrative interface adapter, according to one or more embodiments described herein.

FIG. 2 is a perspective view depicting an illustrative adapter 200, according to one or more embodiments. The illustrative adapter 200 depicted in FIG. 2 includes a first interface 120 and a second interface 130 disposed on opposite sides of a backplane 210. In at least some embodiments, the backplane 210 can include a circuit board containing traces or similar conductors linking the first interface 120 with the second interface 130.

In at least some embodiments, the adapter 200 can be configured to fit within another structure, for example a 3.5 inch SATA compliant HDD (hard disk drive) carrier. An illustrative 3.5 inch SATA compliant HDD carrier can have dimensions of about 4 inches (101 mm) wide by about 1 inch (25 mm) high by about 5.75 inches (146 mm) long. Where the adapter 200 is configured to fit within a 3.5 inch SATA compliant HDD carrier, the peripheral device 140 coupled to the second interface 130 can include PCI, PCI-X and PCIe low profile short cards having dimensions of about 1 inch (25 mm) to 2.625 inches (67 mm) in width and about 4.75 inches (121 mm) in length. Such an installation would permit the exposure of at least a portion of the first interface 120 from the HDD carrier, thereby permitting the slidable insertion of the carrier into an electronic device containing a 3.5 inch SATA HDD cage.

Figure 3:
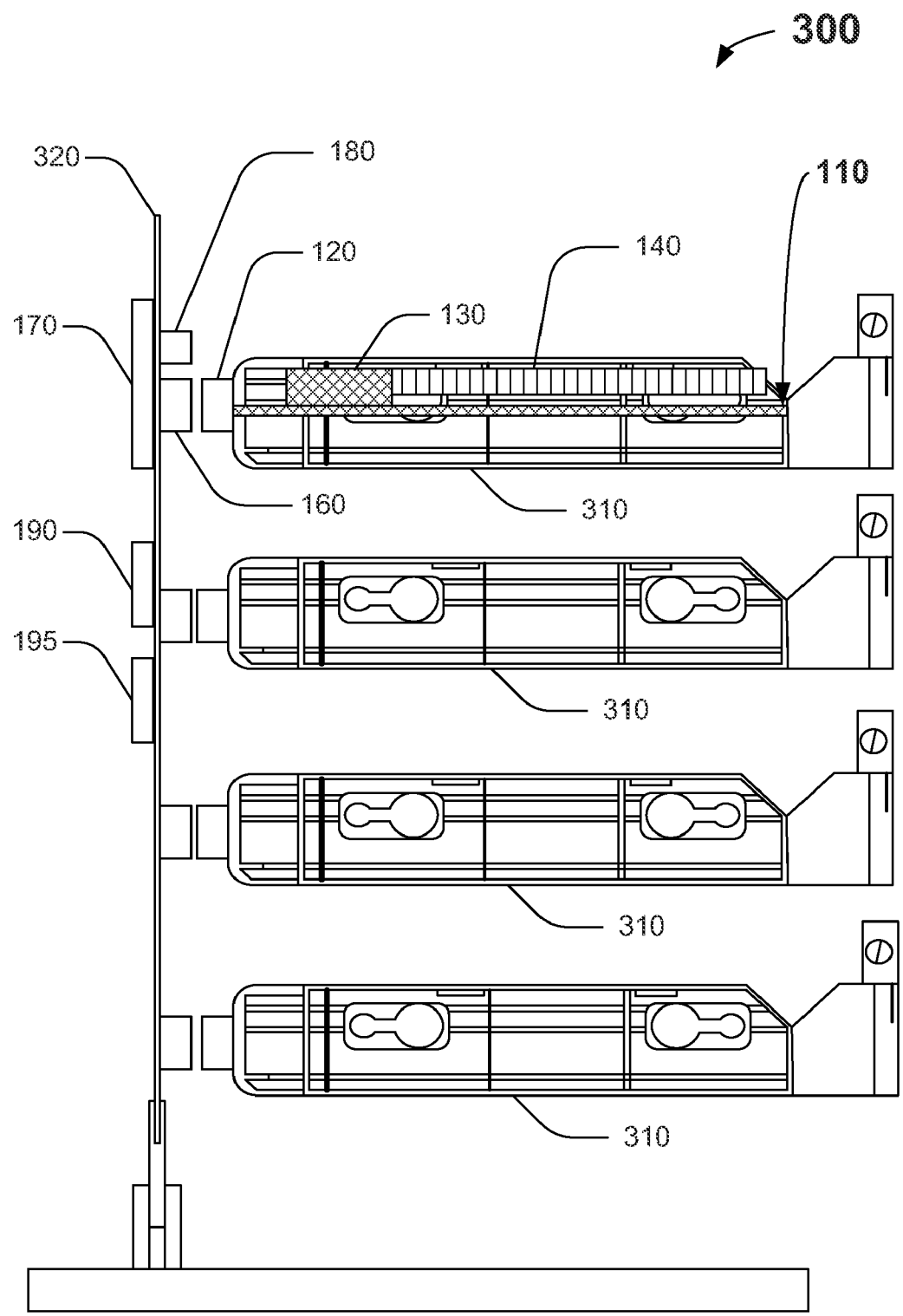
FIG. 3 is an elevation view depicting an illustrative interface adapter system, according to one or more embodiments described herein.

FIG. 3 is an elevation view depicting an illustrative interface adapter system 300, according to one or more embodiments. In some embodiments, the interface adapter system 300 can include a plurality of 3.5 inch SATA compliant HDD carriers 310, with an adapter 110 disposed in at least one of the carriers 310. A peripheral device 140 can be coupled to the adapter 110. All or a portion of the HDD carriers 310 can be coupled to a backplane 320 via one or more first interfaces 120 and one or more complimentary first interfaces 160 disposed in, on, or about the backplane 320.

Figure 4:
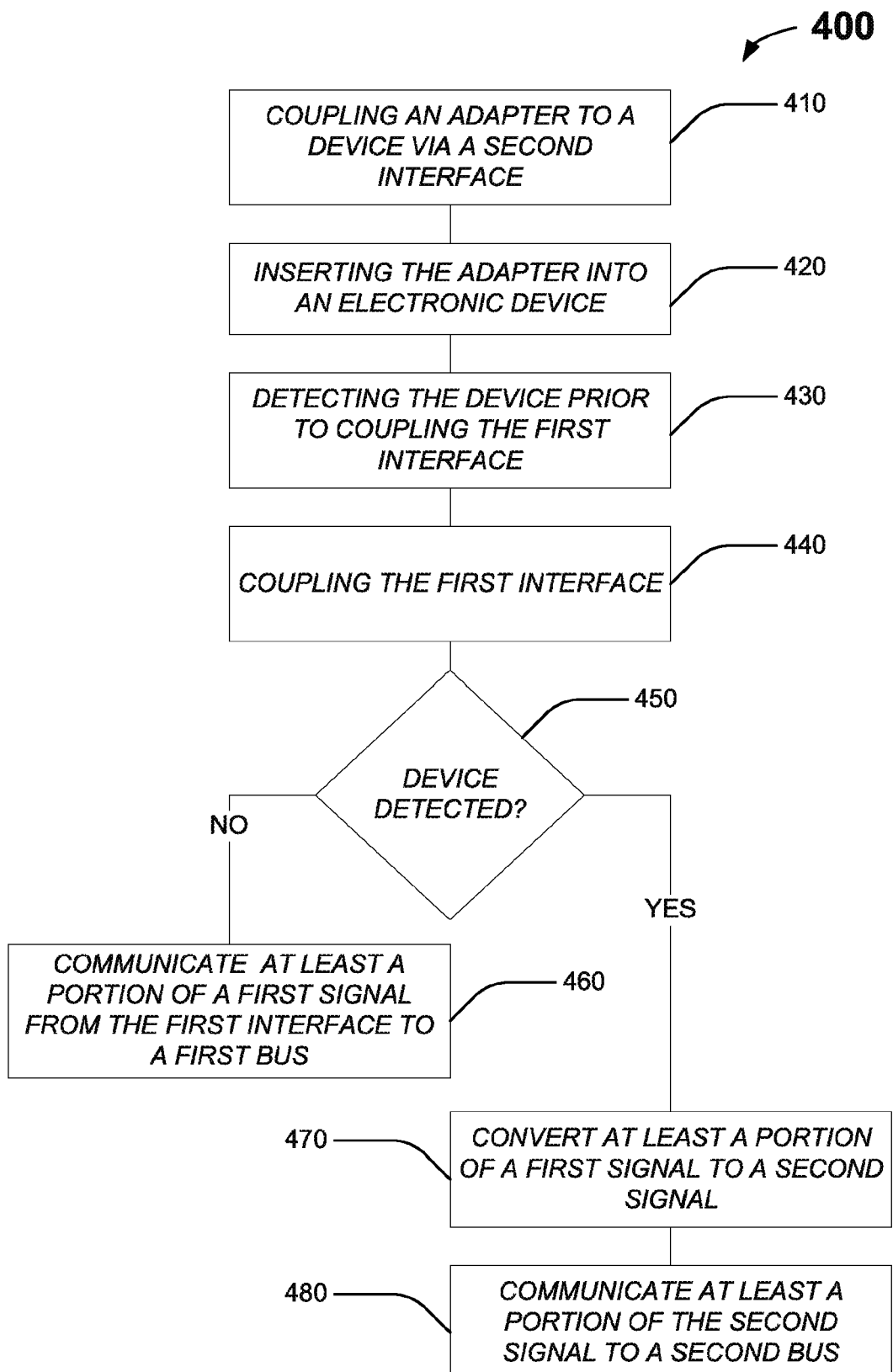
FIG. 4 is a logic flow diagram depicting an illustrative interface adapter method, according to one or more embodiments described herein.

FIG. 4 is a logic flow diagram depicting an illustrative interface adapter method 400, according to one or more embodiments. The method 400 can include connecting an adapter 110 to a peripheral device 140 via a second interface 130 at 410. An illustrative example can include, but is not limited to, coupling a PCIe card to a PCI-compliant second interface 130 disposed in, on, or about the adapter 110.

The method 400 can further include inserting the adapter 110 containing the peripheral device 140 into an electronic device 150 at 420. An illustrative example can include, but is not limited to, inserting the adapter 110 and attached peripheral device 140 into a 3.5 inch SATA-compliant HDD carrier 310, then slidably inserting the HDD carrier containing the adapter 110 into an electronic device 150.

The method 400 can include detecting the peripheral device 140 coupled to the adapter second interface 130 prior to coupling the first interface 120 to the complimentary first interface 160 disposed in the electronic device 150 at 430. An illustrative example can include, but is not limited to, detecting the PCI compliant peripheral device 140 coupled to the adapter 110, and transmitting a signal via one or more conductors 185 to the processor 170 thereby permitting the configuration of the complimentary first interface 160 prior to coupling the first interface 120.

The method 400 can then include coupling the first interface 120 to the complimentary first interface 160 at 440. An illustrative, non-limiting, example can include coupling a male, SATA compliant, first interface 120 disposed on the adapter 110 to a female, SATA compliant, complimentary first interface 160 disposed at least partially within the electronic device 150.

The method can include passing at least a portion of the signal from the first interface 120 to the first bus 190 at 460 if a peripheral device was not detected at 450. An illustrative example can include, but is not limited to, passing a SATA compliant signal from the first interface 120 through the complimentary first interface 160 to the processor 170 via the one or more conductors 165. The signal can be passed, modified or unmodified, from the processor 170 to a SATA compliant first bus 190 via the one or more conductors 175.

The method can also include converting at least a portion of the signal from the first interface 120 at 470 if a peripheral device was detected at 450. An illustrative example can include, but is not limited to, multiplexing a SATA non-compliant signal into one or more SATA compliant signals using the processor 170. Another illustrative example can include, but is not limited to, converting a SATA non-compliant signal into one or more PCI compliant signals using the processor 170.

The method can include communicating at least a portion of the converted signal from the processor 170 to the second bus 195 via one or more conductors 175 at 480. An illustrative example can include, but is not limited to, communicating a multiplexed signal to a remote demultiplexer via the first bus 190 where the signal is demultiplexed into at least one independent PCI compliant signal transmitted via a PCI compliant second bus 195. Another, non-limiting, illustrative example can include transmitting a converted PCI compliant signal from the processor 170 to a PCI compliant second bus 195 via the one or more conductors 175.

While the foregoing is directed to embodiments of the present invention, other and further embodiments of the invention may be devised without departing from the basic scope thereof, and the scope thereof is determined by the claims that follow.

We claim the following:

1. A system, comprising:
an adapter comprising:
a first interface coupled to a second interface; and
an electronic device comprising:
a receiver detachably attachable to the first interface, configured to accommodate the adapter;
a processor coupled to the first interface, a detector, a first bus, and a second bus;
the detector configured to provide an indicator upon detection of a peripheral device coupled to the second interface;
the processor configured to convert at least a portion of a first signal communicated via the first interface to a second signal and pass the second signal to the second bus when the indicator is present; and
wherein the processor is configured to pass the first signal communicated via the first interface to the first bus when the indicator is absent.

2. The system of claim 1, wherein the first interface is selected from the group of interfaces consisting of: an Advanced Technology Attachment ("ATA") interface; a Serial ATA ("SATA") interface; a Small Computer System Interface ("SCSI"); a Serial Attached SCSI ("SAS") interface; a fibre channel interface; an IEEE 1394 interface; and a Universal Serial Bus ("USB") interface.

3. The system of claim 1, wherein the second interface is selected from the group of interfaces consisting of: a Peripheral Component Interconnect ("PCI") interface; a Peripheral Component Interconnect Express ("PCIe") interface; and a Universal Serial Bus ("USB") Version 1.0, 1.1, 2.0, or 3.0 interface.

4. The system of claim 1, wherein the detector is selected from the group of detectors consisting of: a mechanical detector, an optical detector, a magnetic detector, an electro-magnetic detector, a proximity detector, and an electrical detector.

5. The system of claim 1, wherein the adapter comprises structure dimensions of a 3.5 inch hard disk drive (HDD) carrier.

6. The system of claim 1:
wherein the first bus is selected from the group of buses consisting of: an Advanced Technology Attachment ("ATA") bus; a Small Computer System Interface ("SCSI") bus; a Serial Attached SCSI ("SAS") bus; a fibre channel bus; an IEEE 1394 bus; and a Universal Serial Bus ("USB") bus; and
wherein the second bus is selected from the group of buses consisting of: a Peripheral Component Interconnect ("PCI") bus and a USB bus.

7. A system, comprising:
an adapter means for coupling a first interface to a second interface;
wherein said second interface is configured to accommodate coupling to a peripheral device;
a detector means for detecting said peripheral device;
a means for communicating a first signal from the first interface to a first bus when said peripheral device is not detected; and
a means for converting the first signal to a second signal and a means for communicating said second signal to a second bus when said peripheral device is detected.

8. The system of claim 7, wherein the first interface is selected from the group of interfaces consisting of: an Advanced Technology Attachment ("ATA") interface; a Serial ATA ("SATA") interface; a Small Computer System Interface ("SCSI"); a Serial Attached SCSI ("SAS") interface; a fibre channel interface; an IEEE 1394 interface; and a Universal Serial Bus ("USB") interface.

9. The system of claim 7, wherein the second interface is selected from the group of interfaces consisting of: a Peripheral Component Interconnect ("PCI") interface; a Peripheral Component Interconnect Express ("PCIe") interface; and a Universal Serial Bus ("USB") Version 1.0, 1.1, 2.0, or 3.0 interface.

10. The system of claim 7, wherein the means for detecting said device is selected from the group of detectors consisting of: a mechanical detector, an optical detector, a magnetic detector, an electro-magnetic detector, a proximity detector, and an electrical detector.

11. A method comprising:
coupling a peripheral device to a second interface disposed on an adapter, the adapter comprising a first interface coupled to the second interface;
detachably attaching the adapter to an electronic device, the electronic device comprising a processor coupled to a detector, first bus and second bus;
detecting the peripheral device prior to coupling the processor to the first interface;
coupling the processor to the first interface;
receiving at the processor, a first signal from the first interface;
communicating at least a portion of the first signal to the first bus when the device is not detected; and converting at least a portion of the first signal to a second signal and communicating at least a portion of the second signal to a second bus when the peripheral device is detected.

12. The method of claim 11, wherein the detector is selected from the group of detectors consisting of: a mechanical detector; an electrical detector; a magnetic detector; a logical detector; and an optical detector.

13. The method of claim 11, wherein the first interface is selected from the group of interfaces consisting of: an Advanced Technology Attachment ("ATA") interface; a Serial ATA ("SATA") interface; a Small Computer System Interface ("SCSI"); a Serial Attached SCSI ("SAS") interface; a fibre channel interface; an IEEE 1394 interface; and a Universal Serial Bus ("USB") interface.

14. The method of claim 11, wherein the second interface is selected from the group of interfaces consisting of: a Peripheral Component Interconnect ("PCI") interface; a Peripheral Component Interconnect Express ("PCIe") interface; and a Universal Serial Bus ("USB") Version 1.0, 1.1, 2.0, or 3.0 interface.

15. The method of claim 11, wherein attaching the adapter into an electronic device comprises:
inserting the adapter into a carrier having dimensions of a 3.5 inch hard disk drive (HDD); and
inserting the carrier into an electronic device having a structure adapted to accommodate an detachable attachment of a 3.5 inch HDD carrier.

16. An apparatus, comprising:
an adapter configured to mount within a 3.5 inch hard disk drive carrier, said adapter comprising:
a first interface couplable to an external electronic device, the first interface comprising a Serial Advanced Technology Attachment (SATA) interface;
a second interface, coupled to the first interface, and couplable to a peripheral device, the second interface comprising a Peripheral Component Interconnect Express (PCIe) interface.

17. The apparatus of claim 16, wherein said electronic device comprises:
a structure disposed within the electronic device, accommodating the 3.5 inch hard disk drive carrier, the structure detachably attachable to the first interface; and
a processor coupled to the first interface via a receiver, a detector, a first, Serial Advanced Technology Attachment (SATA) compliant, bus, and a second, Peripheral Component Interconnect (PCI) compliant, bus;
the detector configured to identify the peripheral device and provide an indicator upon sensing the presence of the peripheral device;
the processor configured to:
convert a first signal communicated via the first interface to a second signal and pass the second signal to the second bus when the indicator is present; and
pass the first signal to the first bus when the indicator is absent.

18. The apparatus of claim 17, wherein the peripheral device comprises a Peripheral Component Interconnect Express (PCIe) compliant expansion card.

19. The apparatus of claim 17, wherein the detector is selected from the group of detectors consisting of: a mechanical detector; an electrical detector; a magnetic detector; a logical detector; and an optical detector.

* * * * *